(No Model.)
J. SCHERER.
DEVICE FOR SIDE SWAGING AND SETTING SAWS.
No. 489,663. Patented Jan. 10, 1893.
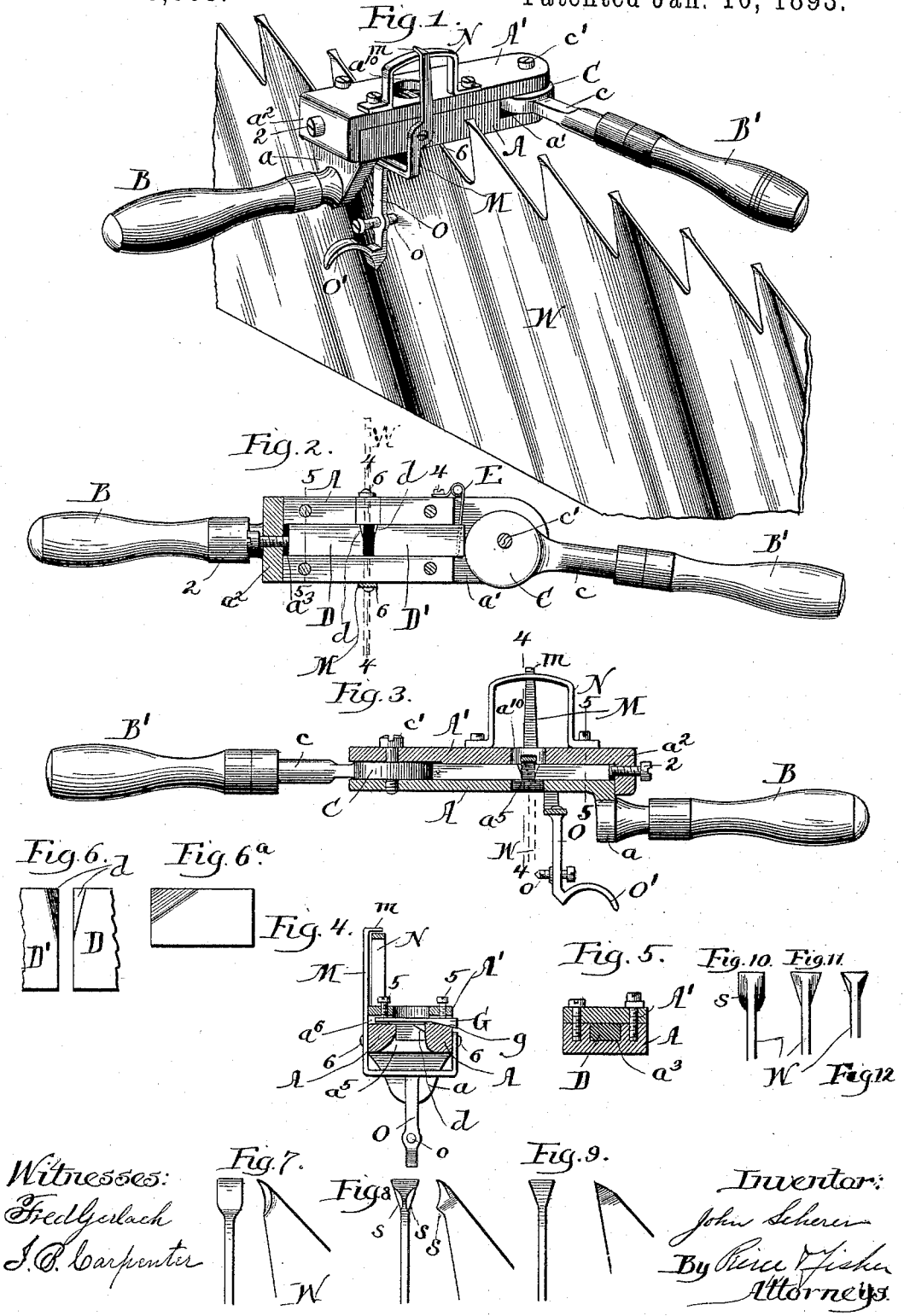
Witnesses:
Fred Gerlach
J. P. Carpenter
Inventor:
John Scherer
By Pierce & Fisher
Attorneys.

UNITED STATES PATENT OFFICE.

JOHN SCHERER, OF NAHMA, MICHIGAN, ASSIGNOR OF ONE-HALF TO GEORGE J. FARNSWORTH, OF SAME PLACE.

DEVICE FOR SIDE-SWAGING AND SETTING SAWS.

SPECIFICATION forming part of Letters Patent No. 489,663, dated January 10, 1893.

Application filed March 21, 1892. Serial No. 425,684. (No model.)

*To all whom it may concern:*

Be it known that I, JOHN SCHERER, residing at Nahma, in the county of Delta, State of Michigan, have invented certain new and useful Improvements in a Combined Side Swage and Set for Saws, of which I do declare the following to be a full, clear, and exact description, reference being had to the accompanying drawings forming part of this specification.

My present invention has for its object to provide an improved instrument whereby the dressing of saw teeth can be more economically and perfectly effected and whereby the proper "setting" of the teeth can be conveniently and accurately secured.

The object of invention I have accomplished by the improved mechanism hereinafter described, is illustrated in the accompanying drawings and particularly defined as to its novel features in the claims at the end of this specification. I wish it understood, however, that while the improved device hereinafter described serves both as a side swage and as a saw set, features of my invention may be employed without its adoption as an entirety and the details of construction may be varied within wide limits by the skilled mechanic without departing from the spirit or scope of my invention.

Figure 1 is a perspective view showing my improved instrument in position upon the blade of a saw. Fig. 2 is a view showing the top section of the body removed, with the exception of its depending end portion. Fig. 3 is a view in vertical section upon a line at one side of the swaging dies. Fig. 4 is a view in transverse section upon line 4—4 of Fig. 3. Fig. 5 is a view in transverse section on line 5—5 of Fig. 3. Fig. 6 is a plan view of the adjacent ends of the side-swaging dies. Fig. 6$^a$ is an end view of one of the dies. Fig. 7 is a view showing front and side elevations of a tooth point that has been swaged or flattened to spread the metal laterally in the usual manner. Fig. 8 is a view showing front and side elevations of a saw tooth, the point of which has been side-swaged by my improved instrument. Fig. 9 is a view showing front and side elevations of a finished saw tooth. Fig. 10 is a back view of the flattened saw tooth shown in Fig. 7. Fig. 11 is a back view of the saw tooth shown in Fig. 8. Fig. 12 is a back view of the finished saw tooth shown in Fig. 9.

The body of the instrument is preferably formed of the separable parts or sections A and A', these sections being suitably bolted together as shown. The lower section A is formed with an off-set or projection $a$, to which is attached the handle B, and the opposite end of this section A is preferably cut away, as at $a'$, to admit the cam or eccentric C, to the shank $c$ of which is connected the handle B'. The eccentric C is perforated to admit its pivot pin or bolt $c'$ which passes through the eccentric and through the top section A' of the body and has a threaded end entering a corresponding threaded perforation in the lower section A of the body. The upper body section A' is preferably formed with the overhanging end portion $a^2$ through which passes a set screw 2 by means of which one of the swaging dies can be adjusted as will presently more fully appear. The body section A has a channel $a^3$ formed in its upper face and within this channel rests the swaging dies D and D' preferably of highly tempered steel. The die D is an adjustable fixed die and the die D' is a movable die, and the rear end of the latter extends into position to be operated upon by the cam or eccentric C, and is held in retracted position against the cam or eccentric by means of a spring E, the free end of which enters a hole in the end of the die D' while the opposite end of this spring is connected as at 4 to the side of the body section A. The body section A is formed with the cut-away space $a^5$ beneath the abutting ends of the dies D and D' in order to permit the saw teeth to pass between the dies and in position for the swaging operation, and by preference a corresponding cut-away space $a^{10}$ is formed in the top body section A'. The under side of the upper body section A' is provided with a transverse channel $a^6$ to receive the bar G whereby is determined the vertical relation of the dies with respect to the saw teeth, that is to say the extent to which the teeth shall project upwardly between the dies. The bar G has its under side provided with the inclined portion $g$ so that by moving this bar in or out along the channel $a^6$ the central portion of the bar against which the ends of the saw teeth will bear, will be raised or lowered so as to permit the teeth to project a correspondingly greater or less distance between the dies. The bar G is fixed at any desired point within the channel $a^6$ by means of set screws 5 that pass through correspondingly threaded holes in the body section A'.

The dies D and D' have their inner or working ends suitably shaped to properly compress the metal adjacent the points of the saw teeth and for this purpose the working end of each of the dies has one of its corners beveled off as at $d$, as more particularly seen in Figs. 6 and $6^a$ of the drawings. Manifestly, however, the exact configuration to be imparted to the dies will depend upon the character of the saws operated upon and will be correspondingly modified. It will be observed, however, that the working ends of the dies have their corners beveled in such manner as to give to the point of the finished tooth a greater thickness at its front or cutting edge than at its back edge so that as the tooth is reduced by wear the front or cutting corners of the tooth will not become rounded so quickly as would occur if the metal of the tooth were of uniform thickness from front to back. This manner of shaping the saw tooth is important because where the metal of the points of the teeth is of uniform thickness from front to back, the front corners which receive the wear speedily become reduced and rounded and render the saw unfit for further use until it has been resharpened.

The operation of the parts of my improved instrument, as thus far defined, will next be more particularly described with relation to the functions of these parts in effecting the side swaging of the tooth points. The teeth of the saw are first swaged or flattened in the usual way and by the means commonly employed for this purpose, so as to impart to the ends of the teeth a configuration like that shown in Fig. 7 of the drawings. After being so swaged, the operator grasping the handles of my improved instrument will place it over the points of the teeth one at a time, the body of the instrument extending at right angles to the saw blade as shown in Figs. 1, 2, and 3, and by turning the handle B' from the position shown in Fig. 2 to the position shown in Fig. 1, will cause the cam C to force inwardly the movable die D' and thereby laterally compress the metal beneath the extreme point of the tooth causing it to assume the form shown in Fig. 8 of the drawings. That is to say, the metal which had been previously flattened or spread laterally by the ordinary swaging operation to the shape shown in Fig. 7, will, by the action of the dies D and D', be forced to the shape shown in Fig. 8, this shape being due to the fact that when the saw tooth (previously shaped as in Fig. 7) is forced between the dies D and D', the laterally extended upper part of the sides of the saw tooth will come against the beveled corners of the dies, and as the dies are forced toward each other the metal adjacent the point of the tooth will be crowded outward and upward, owing to the fact that the outward and upward flare or incline of the dies allows space for the crowding of the metal in such direction only. Hence it is that after the tooth point has been thus compressed between the dies, the excess of metal, which before extended laterally, (as seen in Fig. 7) will be forced forward in front of the edge of the tooth point projecting therefrom as seen at $s$ and $s$ in Fig. 8.

By reason of the fact that the dies D and D' are formed with the beveled corners it will be found that after the tooth point has been shaped by the action of these dies, the front or cutting edge of the tooth point will have a greater thickness than the back edge thereof, as shown by Fig. 11, that is to say, the bevel of the dies will cause a corresponding bevel from front to back through the point of the tooth, the purpose of this being to prevent the rounding of the front or cutting edges of the tooth point as rapidly in use as would occur if the metal of the point were of uniform thickness from front to back. This shaping of the saw tooth will be apparent by reference to Figs. 10, 11 and 12 of drawings. The laterally extended portion of the tooth point is shown as of uniform thickness from front to back while in Fig. 11 the laterally extended metal is shown as inclined or beveled from front to back by reason of the action of the dies D D' thereon.

In Fig. 12 the back of the saw tooth adjacent its point is shown as it will appear after the grinding operation, and by this view also the increased thickness of the front or cutting edge of the tooth is illustrated. When the tooth has been thus side swaged, the operator will again turn the handle B' to the position shown in Fig. 2 thereby permitting the spring E to withdraw the movable die D', thus retracting the movable die D' so as to permit the instrument to be lifted from the tooth point. After all of the teeth of the saw have been thus side-swaged in manner last described, and have been set as will be presently described, the teeth of the saw will be ground so as to remove from their front edges the projections $s$ incident to the side swaging operation and to slightly reduce the back edges of the points leaving the teeth in the finished shape shown by Fig. 9 of the drawings, and ready for use.

By my improved mechanism above described, it will be seen that the dressing of saw teeth can be much more readily effected than would be possible if the teeth after having been shaped as illustrated by Fig. 7 of the drawings were to be brought by grinding or filing, to the desired shape shown in Fig. 9 and moreover, the action of my side swaging dies being perfectly uniform, will insure a much more perfect uniformity of shape to the points of all the saw-teeth. It is obvious that by adjusting the fixed die D, the extent of compression to be imparted to the saw-teeth can be readily determined, this adjustment of the fixed die D being secured by means of the set-screw 2, and it is plain also that by moving inward or outward the bar G, the exact point at which the die shall compress the metal with respect to the cutting edge of the teeth can be readily controlled.

The indicator or gage mechanism to be used in conjunction with the parts hereinbefore described to effect the "setting" of the saw teeth, will next be described. To the underbody section A of the instrument is pivotally connected an indicator pointer M, the upper end of this pointer being preferably bent as at $m$, to travel over a segment or arched bar N, the central point of which will be suitably marked thereon. The pointer M has formed in piece therewith or suitably connected thereto a contact bar O the upper end of which is preferably yoke-shaped and is pivoted as at 6, to each side of the lower body section A of the instrument. Through the contact bar O passes a set screw $o$, the end of which will bear against the saw blade W and by preference the lower end of the contact bar is extended as shown to form a hook O' that can be conveniently held by the finger of the operator while the handles B and B' are within his grasp. The contact bar, as more particularly seen in Fig. 3 of the drawings, is not in the same vertical plane with the indicator pointer M, but is at one side thereof, so as to permit this bar to extend at one side of the saw-blade, while the indicator pointer is in line with the saw blade and registers with the center mark of the segment bar N.

The operation of my improved instrument in setting the teeth of a saw is as follows: When the operator has side swaged and imparted the proper "set" to the first tooth of the saw, (it being understood that the proper "set" will be given to the first tooth by the usual implements employed for such purpose) the set screw $o$ will be brought to bear upon the saw blade W, and will be adjusted until the indicator pointer M is in exact alignment with the center mark of the segment bar N. The first tooth having been perfectly set serves as a pattern, and it follows that each succeeding tooth will be properly set when with the set screw $o$ bearing against the side of the saw-blade, the indicator pointer M registers with the central mark of the segment bar N. If therefore the operator having "side swaged" the tooth finds that with the set-screw $o$ bearing against the side of the saw blade the indicator pointer M does not register with the center mark of the segment bar, he will depress or turn downward either the handle B or B' until the tooth is so bent as to cause the indicator pointer to exactly coincide with the center mark of the segment bar. It will thus be seen that as the teeth are swaged they can also be quickly and accurately "set."

It is obvious that when it is desired to give a "spring set" so called, to the teeth of the saw the exact degree of set can be determined by the contact bar and by the indicator pointer. That is to say if when the first tooth has been given the desired "spring set" the indicator pointer M is at one side of the center mark of the segment bar N a corresponding set can be imparted to alternating teeth after they have been swaged by raising or depressing the handles of the instrument until the indicator pointer registers with the same mark upon the segment bar.

I do not wish my invention to be understood as restricted to the details of construction above set out as these may be varied by the skilled mechanic within wide limits and so also certain features of my invention may be employed without its adoption as an entirety.

Having thus described my invention, what I claim as new and desire to secure by Letters Patent is:—

1. An instrument of the kind described comprising the combination of a body, two dies carried by the said body, one of said dies being movable, a handle fixed to the body adjacent the outer end of one of said dies, and a handle pivoted to the body adjacent the outer end of the other of said dies and provided with a cam whereby the movable die is operated, said handles being thus arranged to extend at opposite sides of the saw blade to be swaged, substantially as described.

2. An instrument of the kind described comprising the combination of a body formed of separate parts or sections A and A', a fixed die D and a movable die D' held between said sections a cam C pivoted between said sections adjacent the end of the movable die, a handle B' for operating said cam, and a handle B at the opposite end of the body for holding the same, substantially as described.

3. An instrument of the kind described comprising the combination of a body provided with "side swaging dies," the body being cut away to permit the saw teeth to pass between said dies, a cam for operating one of said dies, and two separate handles whereby said body may be manipulated, one of said handles being pivoted adjacent the outer end of one of said dies and the other of said handles being located at the opposite end of the instrument, substantially as described.

4. An instrument of the kind described comprising a body provided with two swaging dies having their front upper corners beveled to give thereto both an upward and an outward flare or incline, and suitable means for operating one of said dies, substantially as described.

5. An instrument of the kind described comprising the combination of a body having a cut away space to permit the saw tooth to pass between the dies carried by said body, two dies one of which is movable, suitable means for operating the movable die, and a longitudinally adjustable bar G extending above the cut away space of the body and provided with an incline $g$, the face of which bears against a part of the body and means for holding said bar G in different positions, substantially as described.

6. An instrument of the kind described comprising the combination with a body provided with suitable means whereby it may be rocked across the plane of the saw blade, and provided with means for engaging with the opposite sides of the saw teeth, of a movable indicator pointer connected to said body, and a contact bar connected to said indicator pointer, substantially as described.

7. An instrument of the kind described comprising the combination of a body having handles at its opposite ends and provided with means for engaging the opposite sides of the saw teeth, an indicator pointer connected to said body, and a contact bar connected to said body and to said indicator pointer and arranged to move at right angles to the plane of the saw blade, substantially as described.

8. An instrument of the kind described comprising the combination with a body having means whereby it may be manipulated and having means for engaging the opposite sides of the saw teeth, of an indicator pointer and a contact bar movably connected to said body, said contact bar having a set screw for determining its position with respect to the saw blade, substantially as described.

9. An instrument of the kind described comprising the combination of a body provided with swaging dies and means for operating one of said dies, a movable indicator pointer connected to said body and a contact bar connected to said indicator pointer and extending downward from the body, substantially as described.

10. An instrument of the kind described comprising the combination of the body, two side swaging dies D D', a handle B, and a movable handle B', for operating one of said dies, a pivoted indicator pointer M, a contact bar O connected to said indicator pointer and a segment bar N adjacent the indicator pointer, substantially as described.

11. An instrument of the kind described, comprising a body having handles at its opposite ends, an indicator pointer pivotally connected to said body, a contact bar joined to said indicator pointer but extending at one side of the vertical plane thereof, said contact bar being provided with a hook or extension, substantially as described.

JOHN SCHERER.

Witnesses:
GEO. J. FARNSWORTH,
W. J. ELLIS.